(12) United States Patent
Saito

(10) Patent No.: US 6,285,430 B1
(45) Date of Patent: Sep. 4, 2001

(54) LIQUID CRYSTAL DISPLAY DEVICE

(75) Inventor: Yukito Saito, Sagaihiara (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/280,733

(22) Filed: Mar. 29, 1999

(30) Foreign Application Priority Data

Apr. 16, 1998 (JP) .................................................. 10-106140

(51) Int. Cl.⁷ ........................ G02F 1/1343; G02F 1/1335
(52) U.S. Cl. ........................ 349/141; 349/102; 349/118
(58) Field of Search .................................... 349/141, 102, 349/103, 117, 118

(56) References Cited

U.S. PATENT DOCUMENTS 5,598,285 * 1/1997 Kondo et al. ........................ 349/141
6,052,168 * 4/2000 Nishida et al. ...................... 349/141
6,100,945 * 8/2000 Crandall et al. ..................... 349/117
6,111,625 * 8/2000 Ohta et al. ........................... 349/141
6,115,095 * 9/2000 Suzuki et al. ........................ 349/118
6,128,061 * 10/2000 Lee et al. ............................. 349/141

* cited by examiner

Primary Examiner—William L. Sikes
Assistant Examiner—Tai V. Duong
(74) Attorney, Agent, or Firm—J. P. Sbrollini (57) ABSTRACT

This LCD cell device configuration reduces the deterioration in contrast when the display surface of the active matrix type liquid crystal display device of the in-plane switching mode is viewed from the direction of azimuth 45° without decreasing the viewing characteristic from a frontal direction. This is accomplished using an optical compensation film having a retardation axis which is parallel to or vertical to the transmission axes of the polarizer plates at the lower and upper side. By so selecting the in-plane retardation and the retardation in the thickness direction of the optical compensation film, the optical compensation film performs the function of a λ/2 plate, to rotate the polarizing plane of the transmitted light.

11 Claims, 8 Drawing Sheets

RETARDATION IN THICKNESS DIRECTION
OF POLARIZER PLATE (nm)

FIG.12

RETARDATION IN THICKNESS DIRECTION
OF POLARIZER PLATE (nm)

LIQUID CRYSTAL DISPLAY DEVICE

FIELD OF THE INVENTION

The present invention relates to an active matrix type liquid crystal display (LCD) device. More particularly, the present invention relates to a LCD device with a so called In-Plane Switching (IPS) mode in which a transmission/shut off of the light is controlled by applying an electric field in a lateral direction to liquid crystal molecules oriented in a horizontal direction.

BACKGROUND ART

A liquid crystal layer of a twisted nematic liquid crystal with an electric field applied in the vertical direction to the substrates has been used as a display device. In this type of display, two polarizer plates, the polarizing axes of which are crossed to each other, are arranged on the both dies of the liquid crystal layer. When the electric field is applied, the liquid crystal molecules are orientated in the vertical direction, in order to obtain a black image. However, with liquid crystal molecules aligned in the vertical direction, light transmitted through the liquid crystal layer at an oblique angle is double refracted by the liquid crystal molecules, rotating polarizing direction, so that when an operator views the LCD device at the oblique angle, the display of full black image is not obtained. This narrows the viewing angle in which the operator can see the displayed image with the desired high contrast.

To solve the described problem, it has been proposed that the LCD device be operated with the IPS mode in which the direction of the electric field applied to the liquid crystal is in parallel to the substrates. It is known that, in the IPS mode, since the liquid crystal molecules are mainly rotated in a plane parallel to the substrates, the difference in the degree of the double refraction, or birefringence, when the electric field is applied and when it is cut off is reduced providing a wider viewing angle.

One of methods for improving the viewing angle and tint of an LCD device operated in the IPS mode, uses an optical compensation material having the birefringent characteristic disposed between the liquid crystal layer and the polarizer plate. In a Japanese published application 5-505247 based upon a PCT filing, an IPS mode optoelectronic liquid crystal switching element is disclosed in which a birefringent optical compensation component is disposed between the substrates and the polarizer. In a Japanese Published Unexamined Patent Application 9-80424, a birefringent medium is disposed between the substrates and the polarizer plate LCD device operating in the IPS mode. The angle between a polarizing axis of the polarizer plate and a retardation axis direction of the birefringent medium is 20°~60°, preferably 30°~50°. This solves the problem of having a white color image or a gray scale image is cast with a yellow or a blue tint, when the image is viewed from the oblique angle.

The IPS mode of operation has one principle visual characteristic defect. The IPS mode uses the liquid crystal molecules having a homogeneous structure arranged in the horizontal direction and two polarizing plates, their transmission axis cross each other at 90° directed in an upper/lower direction and a right/left direction with respect to the front of the display surface. When the display surface is viewed at an oblique angle in the upper/lower direction and the right/left direction, the two transmission axis can be seen to cross each other at right angles, and the birefringence in the liquid molecules of the homogeneous structure is less than that of a twisted mode liquid crystal layer. As a result, a sufficient contrast is realized. However, when the display surface is viewed from a direction of an azimuth 45°, the two transmission axis are in a positional relationship at which the angle between them is shifted from 90°, the transmitted light generates the birefringence, and light is leaked. As a result, a sufficiently black state is not obtained.

Figure 1:
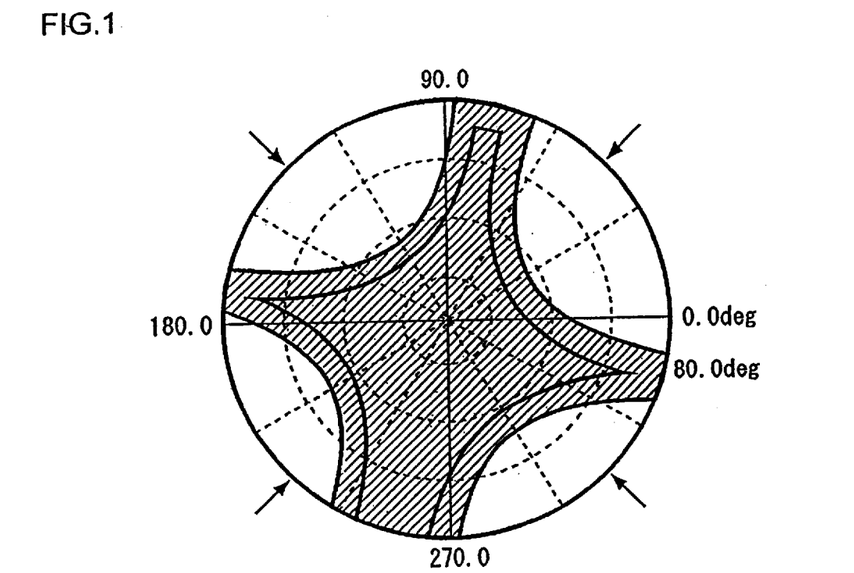
FIG. 1 shows a graph showing the contrast curves of the prior LCD device.

FIG. 1 shows calculated results of the contrast curves of prior LCD devices operated in the IPS mode. The portion, shaded by slanted lines, indicates the area having a contrast more then 50. It is apparent from the figure that a decrease of the contrast occurs at angle 45° from the polarizing axis of one or the other of the polarizing plates, or at the azimuths 45°, 135°, 225° and 315°. As a result of that the decrease of contrast, an inversion of a luminance (brightness) is generated in the black and gray scale areas.

Therefore, it is an object of the present invention to provide a means for improving the contrast in the 45° directions without decreasing the characteristics in the front direction, the upper/lower direction and the right/left direction in the LCD device operated in the IPS mode which provides the high contrast in the front, upper/lower and right/left directions.

SUMMARY OF THE INVENTION

The present invention relates to a liquid crystal display device which comprises: a first polarizer plate, a first substrate, a liquid crystal layer, a second substrate and a second polarizer plate disposed in this order; an active matrix drive electrode group including a plurality of pairs of electrodes, each pair of which is assigned to one pixel, formed on a surface, which is adjacent to the liquid crystal layer, of one of the first substrate and the second substrate; and an optical compensation film disposed between the first polarizer plate and the first substrate; wherein one of the first polarizer plate and the second polarizer plate has a transmission axis which is parallel to a liquid crystal retardation axis of the liquid crystal layer in a state displaying a black, and the other has a transmission axis which is perpendicular to the liquid crystal retardation axis; and wherein a smaller angle of angles formed by a film retardation axis of the optical compensation film and the transmission axis of one of the first polarizer plate and the second polarizer plate is 0°~2° or 88°~90°.

The present invention relates to a liquid crystal display device, wherein an in-plane retardation of the optical compensation film is 190 nm~390 nm.

The present invention relates to a liquid crystal display device, wherein an in-plane retardation of the optical compensation film is 190 nm~390 nm and a retardation in a direction of thickness of the optical compensation film is 0.3~0.65.

The present invention relates to a liquid crystal display devices, wherein an in-plane retardation of the optical compensation film is 210 nm~310 nm and a retardation in a direction of thickness of the optical compensation film is 0.3~0.65.

The present invention relates to a liquid crystal display device which comprises: a first polarizer plate, a first substrate, a liquid crystal layer, a second substrate and a second polarizer plate disposed in this order; an active matrix drive electrode group including a plurality of pairs of electrodes, each pair of which is assigned to one pixel, formed on a surface, which is adjacent to the liquid crystal layer, of one of the first substrate and the second substrate; and an optical compensation film disposed between the first polarizer plate and the first substrate; wherein one of the first polarizer plate and the second polarizer plate has a transmission axis which is parallel to a liquid crystal retardation axis of the liquid crystal layer in a state displaying a black, and the other has a transmission axis which is a perpendicular to the liquid crystal retardation axis; wherein a smaller angle of angles formed by a film retardation axis of the optical compensation film and the transmission axis of one of the first polarizer plate and the second polarizer plate is 0°~2°or 88°~90°; and wherein an in-plane retardation of the optical compensation film is $\{190+4\Delta n_z\}$ nm~$\{390+4\Delta n_z\}$ nm, wherein the $\Delta n$ is an average value of retardations in a vertical direction of the first and second polarizer plates; and a retardation in a direction of thickness of the optical compensation film is $\{0.3+0.005\Delta n_z\}$ nm~$\{0.65+0.005\Delta n_z\}$ nm (in the case of $\Delta n_z < 20$ nm), and $\{0.2+0.01\Delta n_z\}$ nm~$\{0.55+0.01\Delta n_z\}$ nm (in the case of $\Delta n_z \geq 20$ nm).

The present invention relates to a liquid crystal display device, wherein the in-plane retardation is $\{210+4\Delta n_z\}$ nm~$\{310+4\ \Delta n_z\}$ nm.

The present invention relates to a liquid crystal display device, wherein the first polarizer plate has a transmission axis which is parallel to the liquid crystal retardation axis of the liquid crystal layer in a state displaying a black, and the second polarizer plate has a transmission axis which is perpendicular to the liquid crystal retardation axis.

The present invention relates to a liquid crystal display device, wherein liquid crystal molecules of the liquid crystal layer are orientated in a direction to provide the state displaying a black when a voltage applied to the electrodes is at zero level or at a minimum level.

DETAILED DESCRIPTION

In LCD devices, it is generally easier to realize the white level display condition or the maximum bright condition in which the maximum light is transmitted through the liquid crystal layer than to realize the maximum black level display condition in which the light is perfectly shut off. Various efforts have been made in many types of the LCD devices to realize a sufficient black display level. In the LCD devices of the twisted nematic mode broadly used in the past, the liquid crystal molecules are in the rotated condition with the electric field shutoff and the liquid crystal molecules are in the vertically oriented condition when the electric field is applied. Most of the LCD devices use a structure in which the black occurs in the vertically oriented condition when the electric field is applied, since it is easier to realize a black level with the molecules vertically oriented than to realize it the molecules rotated. To realize this condition, the two polarizer plates are disposed on the upper and lower sides of the liquid crystal layer, and their polarizing axis cross each other at 90°. In this case, the light of linear polarization passing through one of the polarizer plate at the shut off of the electric field is rotated by the liquid crystal layer and is outputted through the other polarizer plate so that white is displayed. Such operation is called as a normal white.

In contradistinction to the above described operation, the liquid crystal molecules in the IPS mode are oriented in a predetermined direction at the shut off of the electric field, and the orientational direction is rotated by 45° at the application of the electric field, to display the white or black color display. Most of the LCD devices operating in the IPS mode, have a structure where a normal black is displayed at the shut off of the electric field. The present invention relates to the means for realizing the black color display to obtain the display of the high contrast over a broad viewing angle. Although the condition of the liquid crystal for the normal black display at the shut off of the electric field is described in the following description, the condition of the liquid crystal for the normal white display at the application of the electric field is easily understood.

Figure 2:
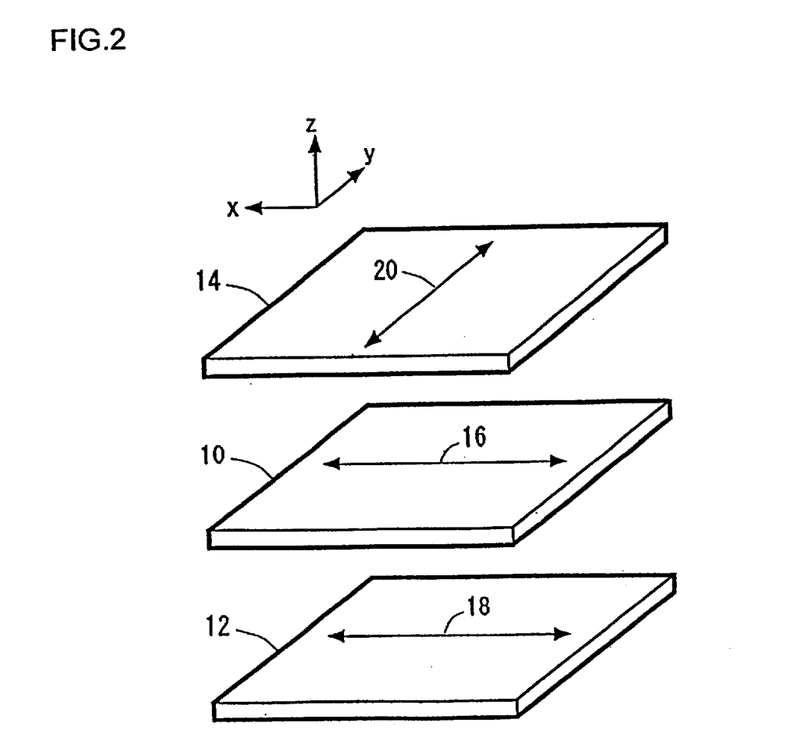
FIG. 2 shows a structure of layers the prior LCD device.

FIG. 2 shows a prior structure for providing an IPS mode of operation. To polarizer plates 12 and 14 are disposed on the upper side and the lower side of the liquid crystal layer 10, respectively, and a major axis direction of the molecules or a liquid crystal retardation axis 16 of the liquid crystal layer 10 is perpendicular to a transmission axis 20 of one of the polarizer plates (the polarizer plate 14 in the FIG. 2), and the liquid crystal retardation axis 16 is parallel to a transmisison axis 18 of the other polarizer plates (the polarizer plate 12 in the FIG. 2). The incident light into the polarizer plate from the front direction becomes the linear polarization having a polarizing plane in the direction of the transmission axis, the polarizing plane of the linear polarization transmits through the liquid crystal layer 10 without being rotated since the polarizing plane is parallel or perpendicular to the liquid crystal retardation axis, and the polarizing plane is shut off by the polarizer plate 12, whereby the black color display is obtained. In the contradistinction to the vertical incident light, the incident light to one polarizer plate at an oblique angle has a component which is parallel to the transmission axis of the other polarizer plate, and generates the birefringence in the liquid crystal layer, and hence a portion of the light transmits through the other polarizer plate without being shut off, whereby a sufficiently black display level is not obtained lowering the contrast. The fact that the incident light at the oblique angle has the component in parallel to the transmission axis of the other polarizer plate is intuitively understood by the fact that the two arrows (i.e. the transmission axes 18 and 20) cross at 90° is seen as the character "X" when they are viewed from the right direction, but the character "X" is distorted when they are viewed in the oblique angle and the angle formed by the two arrows is shifted from the 90°.

The transmission axes of the polarizer plates disposed on the upper and lower sides may be parallel or perpendicular to the retardation axis of the liquid crystal. The word "parallel" means that a smaller angle of the angles formed by the two axes is 0°~5°, preferably 0°~2°, more preferably 0°~1°. The word "perpendicular" means that a smaller angle of the angles formed by the two axes is 85°~90°, preferably 88°~90°, more preferably 89°~90°. As the degree of shift from these angles is large, the shut off characteristic of the linear polarization is degraded, and the contrast is lowered.

The inventor of the present invention has found that it is necessary to compensate the birefringence of the light transmitting at an oblique angle to restore the state of the light to the original state to improve the deterioration of the contrast in viewing from the oblique direction, and the improvement can be realized by disposing an optical compensation film having the following characteristics between the liquid crystal layer and the polarizer plate.

Figure 3:
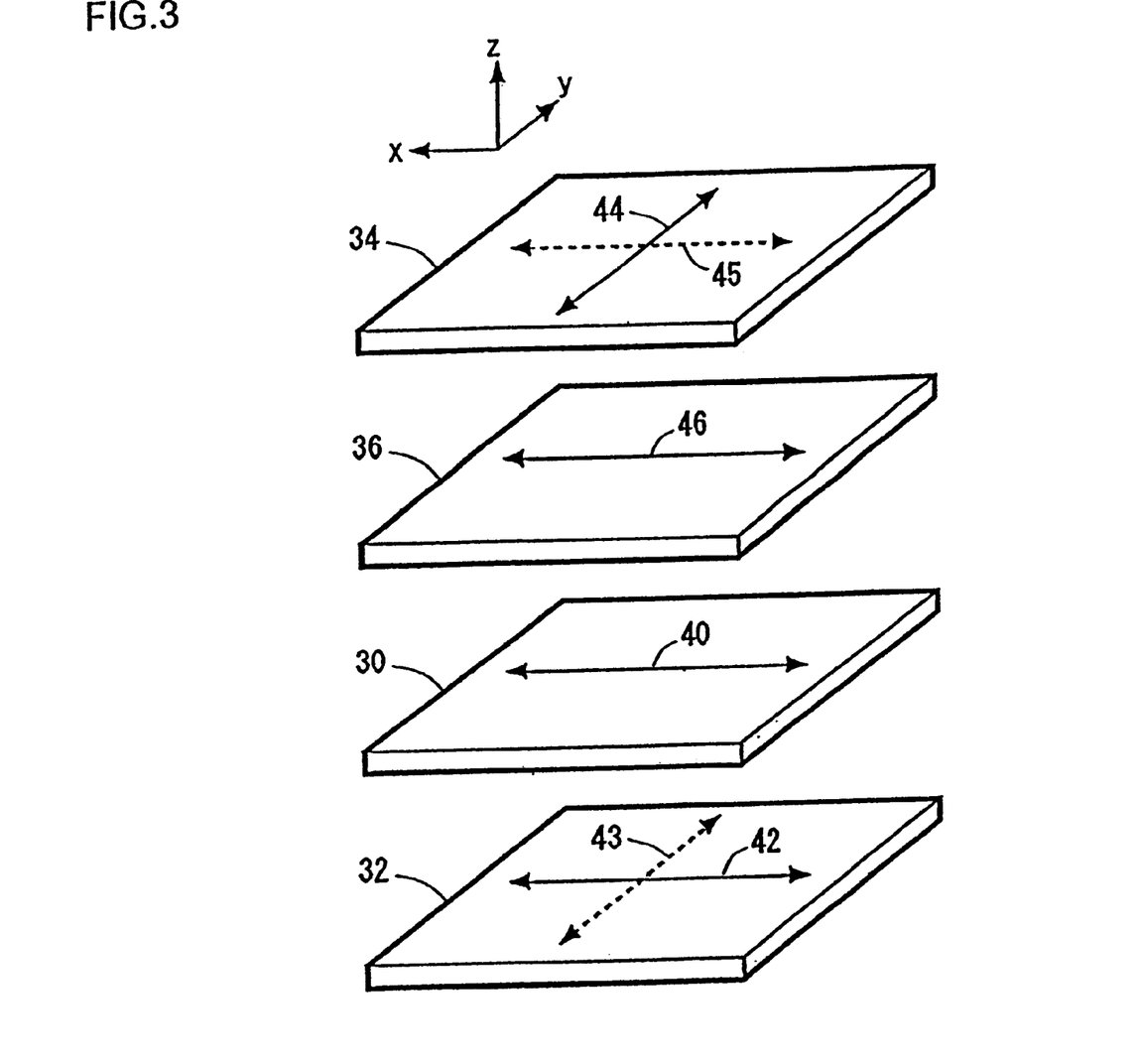
FIG. 3 shows a structure of layers of the LCD device of the present invention.
Figure 4:
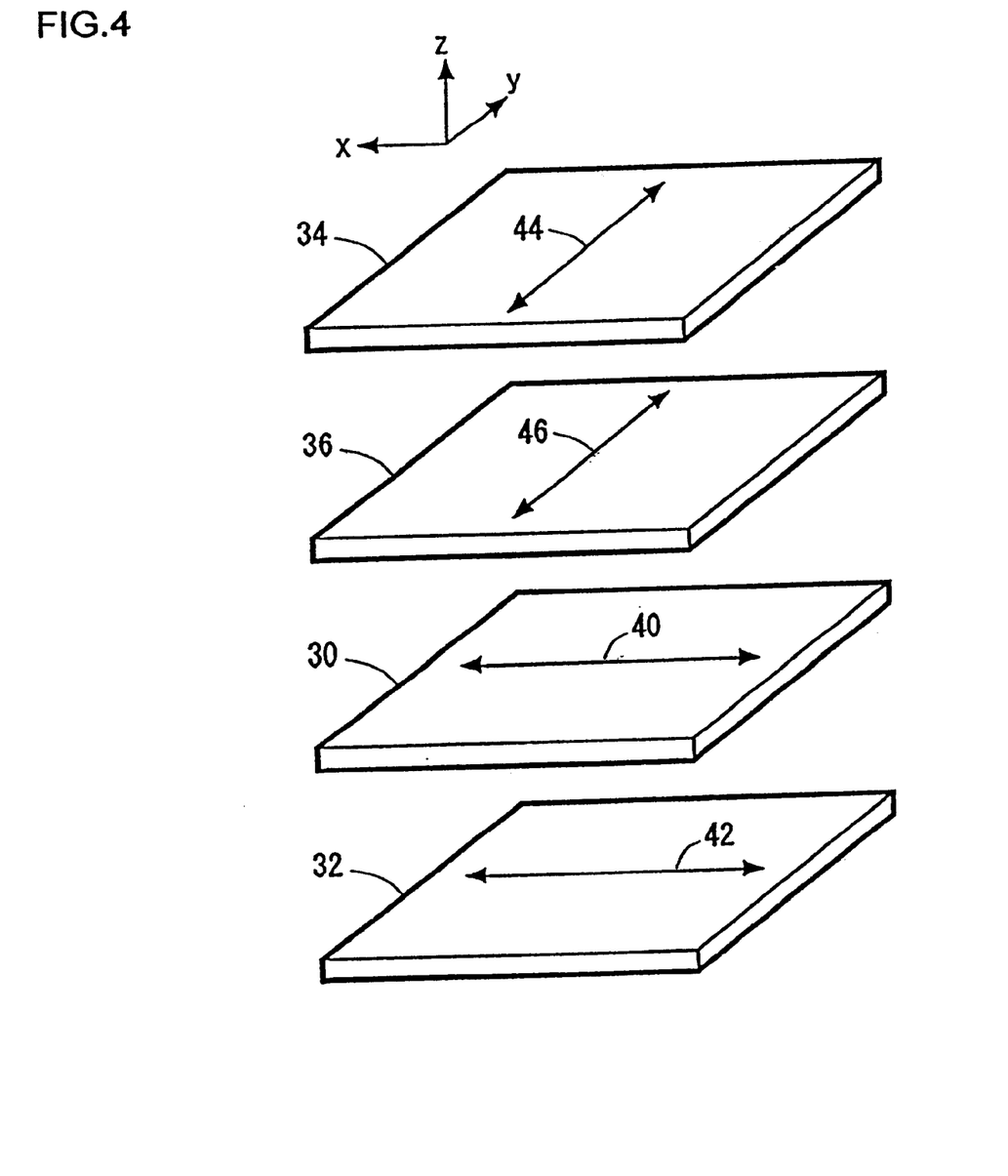
FIG. 4 shows a structure of layers of the LCD device of the present invention.

FIG. 3 shows one example of the present invention. Polarizer plates 32 and 34 are disposed at the upper side and the lower side of the liquid crystal layer 30, respectively, and the optical compensation film 36 is disposed between one of the polarizer plates (the polarizer plate 34 in the FIG. 3) and the liquid crystal layer 30. It is necessary to arrange a film retardation axis 46 of the optical compensation film 36 and a transmission axis 42 of the polarizer plate 32 in parallel, as shown in the FIG. 3, or in vertical, as shown in FIG. 4. By using such arrangement, it is possible that the birefringence of the light from the oblique direction is improved by the optical compensation film without changing the characteristics of the front direction. More particularly, it is preferable that a smaller angle of the angles formed by the film retardation axis 46 and the transmission angle 42 viewed in the front direction is 0°~2°, or 88°~90°. Accordingly, the film retardation axis 46 is in parallel or in vertical to the transmission axes 42 and 44 and the liquid crystal retardation axis 40. In the case that the film retardation axis 46 of the optical compensation film 36 is arranged oblique to the transmission axes 42 and 44 or the liquid crystal retardation axis 40, the incident light from the front direction becomes the linear polarization by the polarizer plate, and this linear polarization becomes an elliptical polarization due to birefringence, so that the normal black in the front direction can not be realized.

The present invention uses the film having the characteristics which rotate the polarizing axis of the linear polarization as the optical compensation film. The reasons for rotating the polarizing axis of the linear polarization in the passage of the light are that the incident light from the oblique azimuth direction to the polarizer plate becomes linearly polarized, and when the polarizing axis of the linear polarization reaches the polarizer plate at the opposite side, the polarizing axis of the linear polarization does not cross at right angles to the polarizing axis of the polarizer plate at the opposite side. The preferred optical compensation film is a film having the characteristics substantially equal to a $\lambda/2$ plate. The $\lambda/2$ plate has a plate in which the retardation value is represented by $\Delta nd=\lambda/2$, ($\lambda$ is a wavelength of the light), and the $\lambda/2$ plate has the characteristics that when the linear polarization with its polarizing plane shifted by $\emptyset$ from the retardation axis of the $\lambda/2$ plate is inputted into the $\lambda/2$ plate, the $\lambda/2$ plate rotates the linear polarization by $2\emptyset$. Wherein, $$\Delta nd=(n_x-n_y)\times d$$

$N_x$ is a refractive index in a direction (x axis) of the film plane in which the refractive index becomes the maximum value.

$N_y$ is a refractive index in a perpendicular direction (y axis) to the x axis in the film plane. and d is a thickness of the film.

As the retardation of the optical compensation film is nearer to the $\lambda/2$, the light reaching the polarizer plate at the opposite side (output side) becomes more linearly polarized. In the case that the range of the wavelength of the visual light is about 380 nm~about 780 nm, the optical compensation film with the retardation value of about 190 nm ~about 390 nm which is half of the range of the wavelength of the visual light is effectively operated in the present invention, and the contrast of the visual light in viewing from the oblique direction can be improved and the characteristics of the viewing angle is improved.

Figure 5:
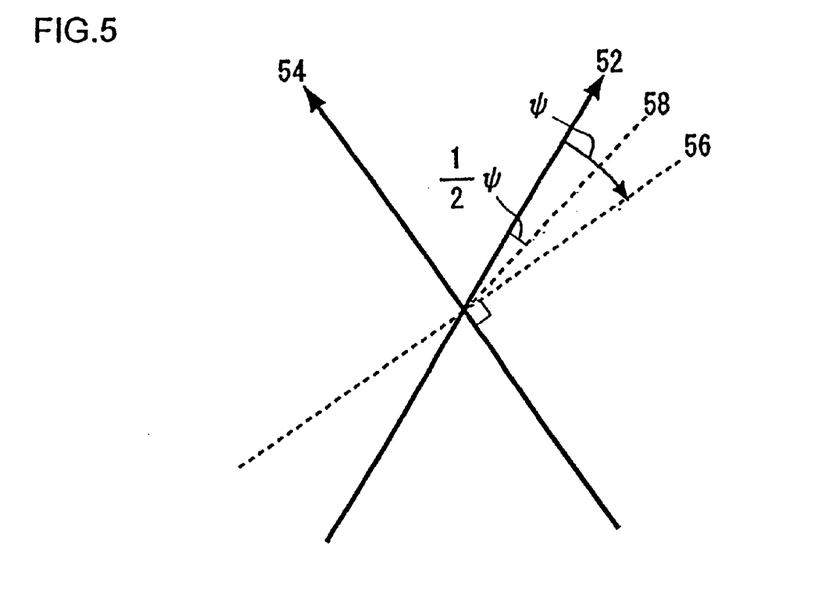
FIG. 5 shows a relation of the axes of the stacked layers of the LCD device of the present invention.

Further, it becomes possible to increase the level of the black color display by arranging the polarizing plane of the rotated linear polarization vertical to the transmission axis of the polarizer plate at the output side in the case that the linear polarization is rotated as it is by the optical compensation film corresponding to the $\lambda/2$ plate. Although such optical compensation film does not give any optical effect on the light from the front direction, the optical compensation film gives the effect as the $\lambda/2$ plate on the light from the oblique direction. The operation of the optical compensation film is described below. FIG. 5 shows the positional relationship of the transmission axes 52 and 54 of the two polarizer plates and the film retardation axis 58 of the optical compensation film when these are viewed from the oblique angle. The optical compensation film is a biaxial film which has two inherent polarizing axes, and each of the polarizing axes has a refractive index. The film retardation axis of the film is the polarizing axis which indicates the larger refractive index when the light passes through the film in the oblique direction. When an absorption axis of the upper polarizer plate and a absorption axis of the lower polarizer plate are viewed from the azimuth direction of 45°, these axes form the character X of long sideways. Since the transmission axis or the polarizing axis is perpendicular to the absorption axis of the polarizer plate, the character X formed by the transmission axes 52 and 54 looks taller than it is broad. The reason for that the film retardation axis 58 of the optical compensation film is shifted from the transmission axis 52 is that the refractive index in the direction of the thickness of the optical compensation film differs from the refractive index in the plane, that is, the film is the biaxial film. The transmission axes 52 and 54 are shifted from the 90° by an angle ψ. The value ψ at the azimuth direction 45° and a polar angle direction $\Theta_0$ is geometrically calculated, (P. Yeh, J.Opt. Soc. Am., 72, P.507 (1982)) and is represented by the following equation.

$$\psi = 2\arcsin\left(\frac{\sin^2\frac{1}{2}\theta_0}{\left(1-\frac{1}{2}\sin^2\theta_0\right)^{\frac{1}{2}}}\right)$$

When the optical compensation film is used which has the characteristics of the $\lambda/2$ plate and is the biaxial film in which its retardation axis is in the direction of the axis 58 or is perpendicular to the axis 58, the angle between the polarizing plane (which is parallel to the transmission axis 52) of the light passing through the polarizer plate at the incidence side and the retardation axis 58 of the optical compensation film is ψ/2 or (ψ/2+90°), and hence the polarizing plane is rotated by the angle ψ or (ψ+180°) at the optical compensation film, whereby the polarizing plane is in consistency with the axis 56 or is in perpendicular to the axis 54, so that the light is perfectly shut off at the polarizer plate of the output side. The inventor of the present invention has performed the experiments based upon the above consideration, and it has been confirmed that the contrast becomes maximum when the retardation $N_z$ in the direction of the thickness is proximity to 0.5, that is when the optical compensation film nearly has the characteristics of the $\lambda/2$ plate, wherein $N_z$ is represented by the following equation.

$$N_z=(n_{x-nz})/(n_x-n_y)$$

It has been reported that, in the case that $N_z=0.5$, the value of the retardation does not depend upon the angle (H.Mori, P.J.Bos: IDRC'97 Digest M-88(1997)), and hence the value of retardation in the oblique angle indicates a value proximity to $\lambda/2$. For this reason, the use of the optical compensation film with such value $N_z$ is further preferable.

Figure 6:
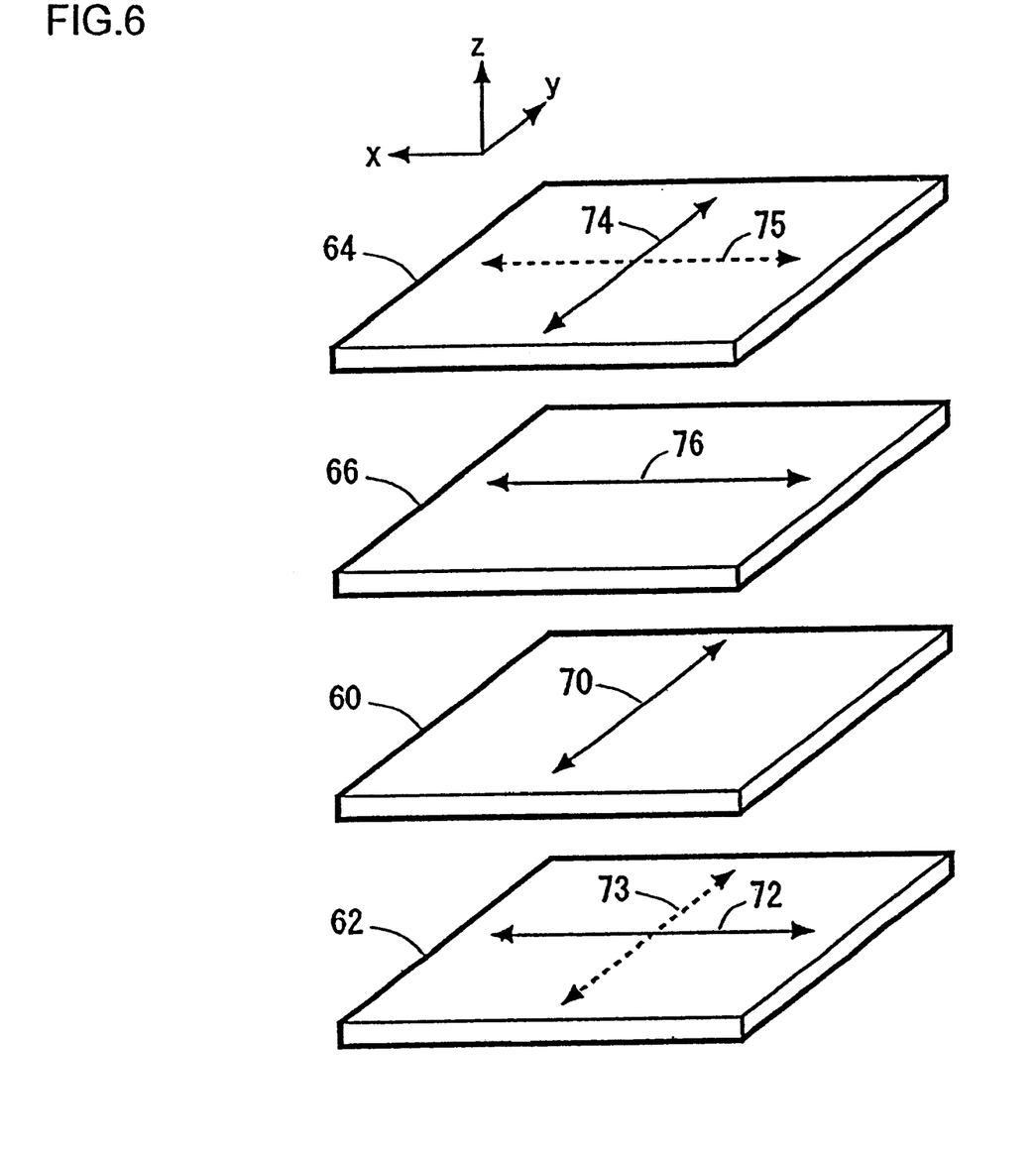
FIG. 6 shows a structure of layers of the LCD device of the present invention.
Figure 7:
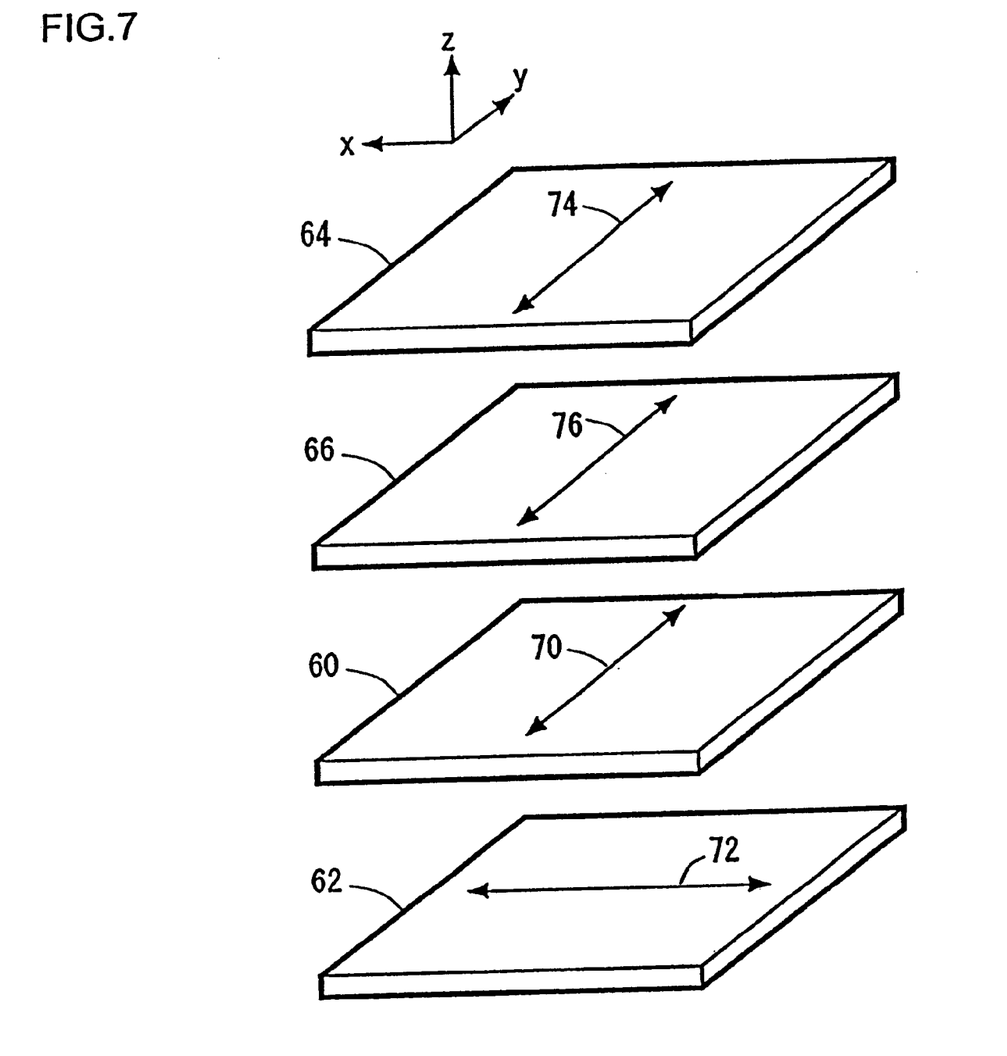
FIG. 7 shows a structure of layers of the LCD device of the present invention.

In the case that the effect of the birefringence in the liquid crystal layer can not be ignored, the liquid crystal retardation axis viewed from the front direction is parallel to the transmission axis of the polarizer plate at the optical compensation film side, and hence the effect of the birefringence in the liquid crystal layer is limited to the minimum level by using the arrangement in which the liquid crystal retardation axis is perpendicular to the transmission axis of the polarizer plate at the output side. FIGS. 6 and 7 show the arrangement in such case. In the case that the light moves from the upper side to the lower side in the oblique azimuth direction in the FIG. 6, for example, the linear polarization of the light passing through the polarizer plate 64 and the optical compensation film 66 is rotated by the angle ($\psi+180°$) at the time that it arrives at the surface of the liquid crystal layer 60, and hence the direction of the linear polarization of the light is perpendicular to the transmission axis of the polarizer plate 62. It is apparent that the liquid crystal retardation axis 70 and the absorption axis 73 of the polarizer plate seem in parallel when they are seen in the oblique direction, and hence the polarizing plane of the linear polarization which arrives at the surface of the liquid crystal layer 60 becomes parallel to the liquid crystal retardation axis. Accordingly, the light, even if it moves in the oblique direction, is not affected by the birefringence of the liquid crystal layer. In the same manner, the light moving from the lower side to the upper side in the oblique direction becomes the linear polarization by the polarizer plate 62, and the linear polarization moving in the oblique direction moves through the liquid crystal layer without being affected by the birefringence of the liquid crystal layer, since the absorption axis 73 of the polarizer plate 62 is parallel to the liquid crystal retardation axis 70 of the liquid crystal layer 60, and the linear polarization is so rotated by the optical compensation film that the polarizing axis of the linear polarization becomes perpendicular to the transmission axis of the polarizer plate 64, the linear polarization is perfectly shut off by the polarizer plate 64.

In contradistinction to the above operation, the light moving from the upper side to the lower side in the oblique azimuth direction in the FIG. 3 becomes the linear polarization in the polarizer plate 34, and the linear polarization is rotated by the angle (104 +180°) by the optical compensation film 36, and hence the polarizing plane of the linear polarization arriving at the liquid crystal layer 30 is perpendicular to the transmission axis 42 of the polarizer plate 32, that is, it is parallel to the absorption axis 43 of the polarizer plate 32. It is apparent, however, that absorption axis 43 of the polarizer plate 32 and the liquid crystal retardation axis 40 is not perpendicular (90°) to each other when they are seen in the oblique direction, and hence the angle between the polarizing plane of the linear polarization which arrives at the liquid crystal layer and the liquid crystal retardation axis 40 deviates from the 90°. Accordingly, the linear polarization passing through the liquid crystal layer 30 becomes the elliptical polarization by the effect of the birefringence, and hence the light is not perfectly shut off by the polarizer plate 32. In the case of the light moving from the lower side to the upper side, the light is not perfectly shut off by the effect of the birefringence.

The subject matter of the present invention is further described with reference to embodiments thereof. These embodiments only show the particular cases of the present invention, and the invention is not limited to the particular embodiments. The embodiments are discussed by using the optical simulations performed by a Jones matrix.

Figure 8:
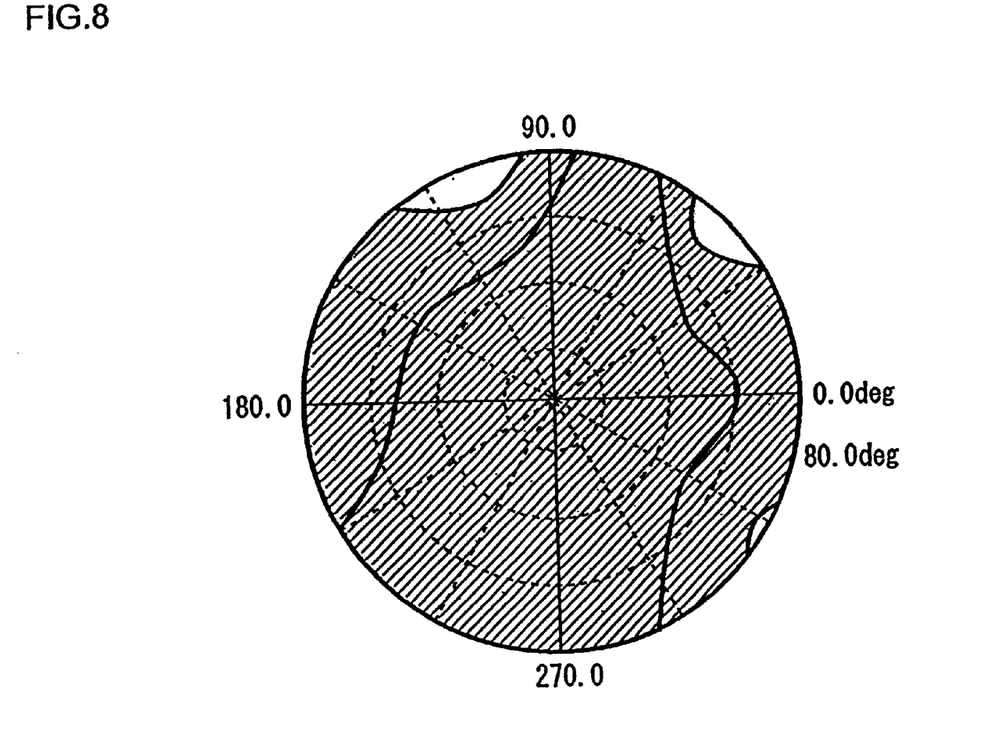
FIG. 8 shows a graph showing the contrast curves of the LCD device of the present invention.

The liquid crystal cells, the electrodes, the substrates and the polarizer plates, etc. used in the prior LCD device can be used in the present invention. The orientation of the liquid crystal cells is the horizontal orientation, and the commercially available liquid crystal cells having a positive dielectric anisotropy for the IPS liquid crystal can be used. The characteristics of the liquid crystal cells are: $\Delta n$ of the liquid crystal=0.078, the cell gap of the liquid crystal layer=4./8 $\mu$m, the pretilt angle=5°, and the rubbing direction=75°. The polarizing axis of the upper polarizer plate is perpendicular to the polarizing axis of the lower polarizer plate, and polarizing axis of one the polarizer plates is parallel to the major axis of the liquid crystal molecule. The visual characteristics can be improved without changing the characteristics in the front direction by disposing the optical compensation film between the polarizer plate and the liquid crystal layer, and by arranging the retardation axis of the in-plane retardation of the optical compensation film perpendiculalr to the polarizing axis of hte polarizer plate. The in-plane retardation of hte optical compensation film is 270 nm, and the retardation in the direction of the thickness is 135 nm. The contrast curves calculated by the above values are shown in FIG. 8. The portion represented by diagonal lines shows an area indicating the contrast more than or equal to 50. It has been found that the contrast more than or equal to 50 is obtained from 0° to 80° in all the azimuth directions. Comparing with the prior contrast shown in FIG. 1, it is apparent that the low contrast in the four directions in the prior technology is remarkably improved by the present invention.

Figure 9:
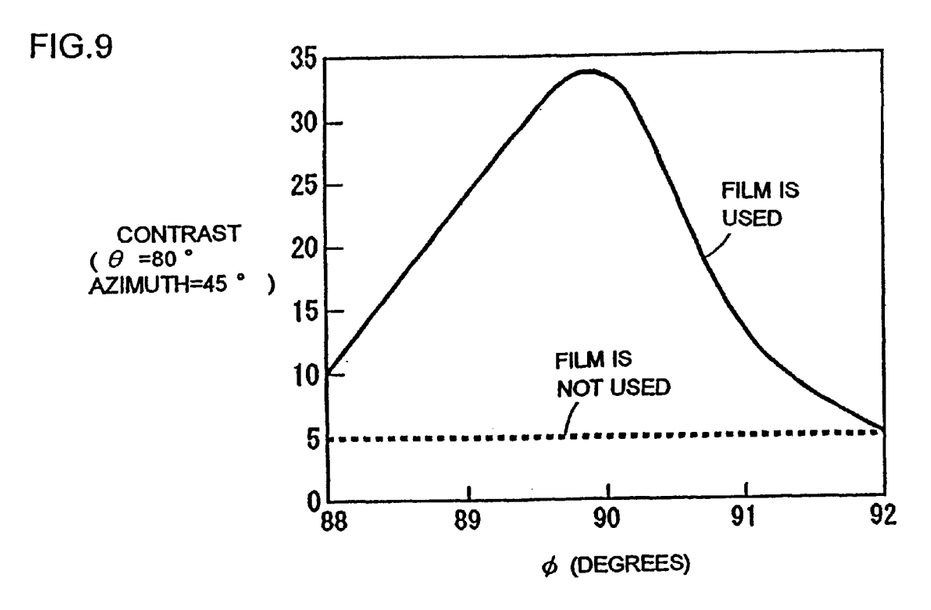
FIG. 9 shows a graph showing the contrast curves of the LCD device of the present invention.

FIG. 9 shows a calculated result of a dependence of the contrast on the angle of the film retardation axis in the plane of the optical compensation film. It is desired that the angle between the in-plane retardation axis of the optical compensation film and the polarizing axis of the polarizer plate is ideally 90 and is preferably in the range of 88°~92° (the smaller angle formed by the two axes is 88°~90°), wherein the measured azimuth direction is 45° and the polar angle direction is 80°.

Figure 10:
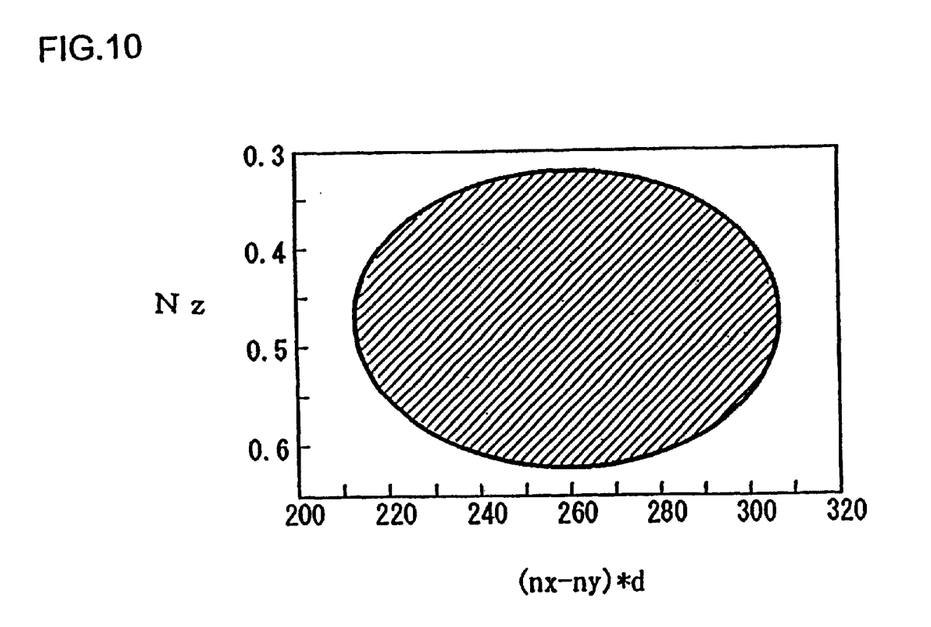
FIG. 10 shows a graph showing a high contrast area realized by the LCD device of the present invention.

FIG. 10 shows the values of the contrast when the retardation $(n_x-n_y)Xd$ in the plane of the optical compensation film and the retardation $N_z=(n_x-n_z)/(n_x-n_y)$ in the direction of the thickness are changed. The portion represented by diagonal lines shows an area indicating the contrast more than or equal to 10 at the azimuth 45° and the polar angle 80°. It is apparent that the high contrast is obtained with a center near to the point of $(n_x-n_y)Xd=270$ nm and $N_z=0.5$, when the $(n_x-n_y)d$ is 210 nm~310 nm, and $N_z$ is 0.3~0.65.

In the above discussion, the retardation of the polarizer plate itself is not considered. In the case that the polarizer plate has the retardation, the contrast is improved with a high precision by defining the physical properties of the optical compensation film in taking account of the retardation of the polarizer plate. The cases that the polarizer plate has the retardation include the case that the substrate itself of the polarizer plate has the retardation and the case that the substrate is sandwiched by protective layers and these protective layers have the retardation. The natural light does not raise the problem even if it is affected by the retardation. The problem arises in the case that the polarized light is affected by the retardation. Even if the protective layers having the retardation are provided on both the surfaces of the polarizer plate, the retardation raising the problem is the retardation at the side facing to the liquid crystal layer. Therefore, the retardation of the polarizer plate in the present invention means the retardation of the substrate itself of the polarizer plate or the retardation of the protective layer provided on the polarizer plate at the side facing to the liquid crystal layer. Triacetyl cellulose (TAC) broadly used as the protective layer has the retardation in the vertical direction. In general, each of both the surfaces of the most of the broadly used polarizer plate is provided with a protective layer which has the retardation value of about 0~70 nm as the retardation $\{(n_x+n_y)/2-n_z\}$ Xd in the thickness direction of the protective layer. In this case, the physical property of the most suitable biaxial film as the optical compensation film, i.e. $(n_x-n_y)$ Xd and $N_z$ may be different values from the values obtained in the case that the retardation of the polarizer plate is zero.

Figure 11:
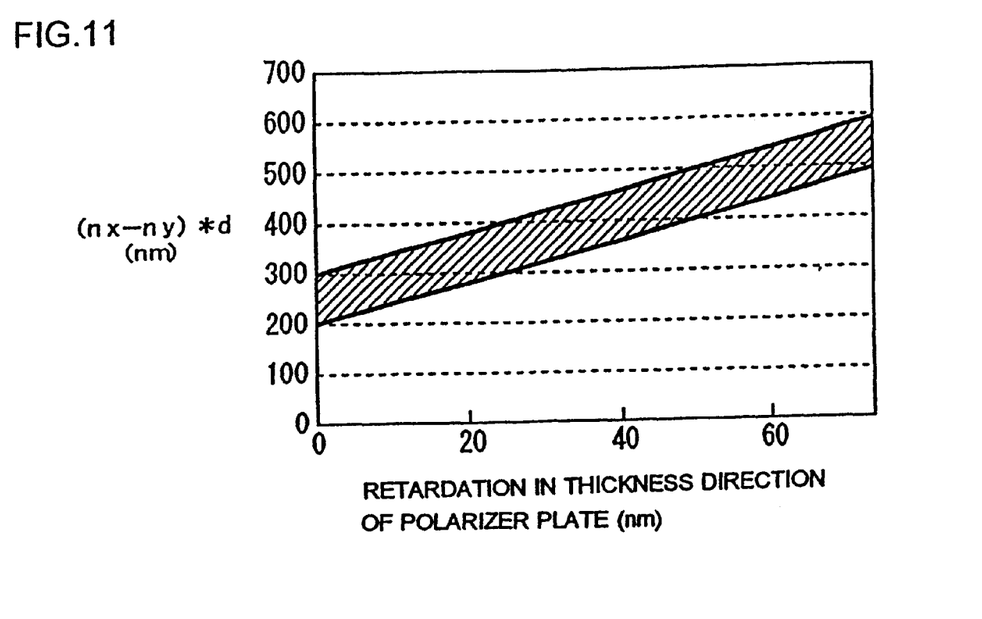
FIG. 11 shows a graph showing a high contrast area realized by the LCD device of the present invention.
Figure 12:
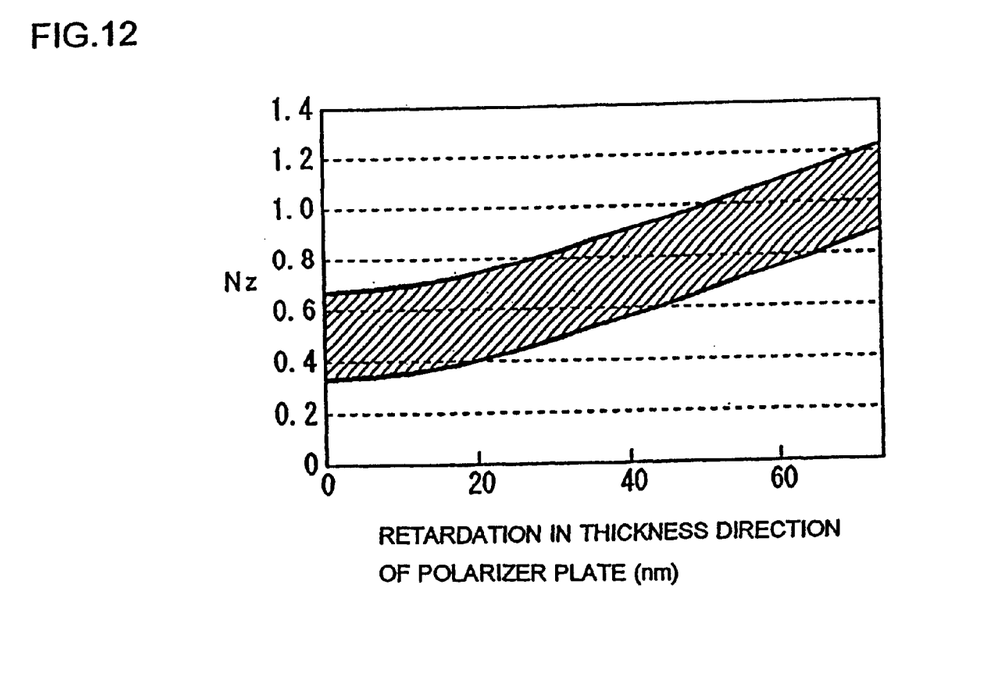
FIG.12 shows a graph showing a high contrast area realized by the LCD device of the present invention.

FIGS. 11 and 12 show the ranges of $(n_x-n_y)$ Xd and $N_z$ for realizing the high contrast when the retardation $\Delta n_z=\{(n_x+n_y)/2-n_z\}$ Xd in the thickness direction of the polarizer plate is changed. The portions represented by diagonal lines in the graphs show an area indicating the contrast more than or equal to 10 at the azimuth direction 45° and the polar angle direction 80°. When the retardation $\Delta n_z$ in the thickness direction of the upper and lower polarizer plates is 40 nm, for example, the range of the optical compensation film having the contrast more than or equal to 10 is $(n_x-n_y)$ Xd=360 nm~460 nm and $N_z$=0.6 ~0.95. Since an inclination in the FIG. 11 is 4 , the in-plane retardation of the optical compensation film is preferably $$\{190+\Delta n_z\} \text{ nm}\sim\{390+4\Delta n_z\} \text{ nm},$$

more preferably $$\{210+4\Delta n_z\} \text{ nm}\sim\{310+4\Delta n_z\} \text{ nm}.$$

Since the inclination in the FIG. 12 is 0.005 (in the case of $\Delta n_z<20$ nm) or 0.01 (in the case of $(\Delta n_z>20$ nm), $\{0.2+0.01\Delta n_z\}$ nm~$\{0.55+0.01\Delta n_z\}$ nm (in the case of $\Delta n_z 20$ nm).

The present invention can improve the visual characteristics without changing the characteristics in the front direction by using the optical compensation film having the retardation axis which is parallel to or vertical to the transmission axis of the polarizer plate. The present invention also can rotate the polarizing axis of the polarized light by using the optical compensation film, and can select the amount of rotation to the appropriate value to improve the deterioration of the contrast viewing from the oblique azimuth direction particularly from 45° due to that the angle between the absorption axes of the two polarizer plates deviates from 90° in viewing from the oblique direction. Further, even if the polarizer plate itself has the retardation, the present invention can improve the deterioration of the contrast by taking account of the retardation. Further, the present invention can improve the deterioration of the contrast due to the effect of the retardation of the liquid crystal itself by arranging the liquid crystal retardation axis of the liquid crystal layer perpendicular to the transmission axis of the polarizer plate adjacent to the liquid crystal layer.

Although the invention has been described in connection with particular embodiments thereof, it should be understood that other embodiments of the invention are possible without departing from the spirit and scope of the applied claims.

I claim:

1. A liquid crystal display device comprising:

a first polarizer plate, a first substrate, a liquid crystal layer, a second substrate and a second polarizer plate disposed in this order;

an active matrix drive electrode group including a plurality of pairs of electrodes, each pair of which is assigned to one pixel, formed on a surface, which is adjacent to said liquid crystal layer, of one of said first substrate and said second substrate; and an optical compensation film disposed between said first polarizer plate and said first substrate;

wherein one of said first polarizer plate and said second polarizer plate has a transmission axis which is parallel to a liquid crystal retardation axis of said liquid crystal layer in a state displaying a black, and the other has a transmission axis which is perpendicular to said liquid crystal retardation axis; and wherein a smaller angle of angles formed by a film retardation axis of said optical compensation film and said transmission axis of one of said first polarizer plate and said second polarizer plate is 0°~2° or 88°~90° wherein an in-plane retardation of said optical compensation film is 190 nm~390 nm and a retardation in a direction of thickness of said optical compensation film is 0.3~0.65.

2. A liquid crystal display device according to claim 1, wherein an in-plane retardation of said optical compensation film is 210 nm~310 nm.

3. A liquid crystal display device according to claim 1, wherein liquid crystal molecules of said liquid crystal layer are orientated in a direction to provide said state displaying a black when a voltage applied to said electrodes is at zero level or at al minimum level.

4. A liquid crystal display device comprising:

a first polarizer plate, a first substrate, a liquid crystal layer, a second substrate and a second polarizer plate disposed in this order;

an active matrix drive electrode group including a plurality of pairs of electrodes, each pair of which is assigned to one pixel, formed on a surface, which is adjacent to said liquid crystal layer, of one of said first substrate and said second substrate; and an optical compensation film disposed between said first polarizer plate and said first substrate;

wherein one of said first polarizer plate and said second polarizer plate has a transmission axis which is parallel to a liquid crystal retardation axis of said liquid crystal layer in a state displaying a black, and the other has a transmission axis which is perpendicular to said liquid crystal retardation axis;

wherein a smaller angle of angles formed by a film retardation axis of said optical compensation film and said transmission axis of one of said first polarizer plate and said second polarizer plate is 0°~2° or 88°∞90°; and wherein an in-plane retardation of said optical compensation film is {190+4 Δn$_z$} nm~{390+4 Δn$_z$} nm, wherein saix Δn is an average value of retardations in a vertical direction of said dirst and second polarizer plates; and a retardation in a direction of thickness of said optical compensation film is {0.3+0.005 Δn$_z$} nm~{0.65+0.005 Δn$_z$} nm (in the case of Δn$_z$<20 nm), and {0.2+0.01 Δn$_z$} nm~{0.55+0.01 Δn$_z$} nm (in the case of Δn$_z$≧20 nm).

5. A liquid crystal display device according to claim 4, wherein said in-plane retardation is {210+4 Δn$_z$} nm~{310+4Δn$_z$} nm.

6. A liquid crystal display device according to claim 4, wherein liquid crystal molecules of said liquid crystal layer are orientated in a direction to provide said state displaying a black when a voltage applied to said electrodes is at zero level or at a minimum level.

7. A liquid crystal display device comprising:

a first polarizer plate, a first substrate, a liquid crystal layer, a second substrate and a second polarizer plate disposed in this order wherein one of said first polarizer plate and said second polarizer plate has a transmission axis which is parallel to a liquid crystal retardation axis of said liquid crystal layer in a black displaying state, and the other has a transmission axis which is perpendicular to said liquid crystal retardation axis;

an active matrix drive electrode group including a plurality of pairs of electrodes, each pair of which is assigned to one pixel, formed on a surface, which is adjacent to said liquid crystal layer, of one of said first substrate and said second substrate to provide an in-plane switching (IPS) mode for the liquid crystal layer;

an optical compensation film configured as a λ/2 plate to rotate the polarizing plane of transmitted light which optical compensation film is disposed between said first polarizer plate and said first substrate with a smaller angle of angles formed by a film retardation axis of said optical compensation film and said transmission axis of one of said first polarizer plate and said second polarizer plate between 0°~2° or 88°~90° to improve contrast in the 45° directions relative to the transmission axes of the first and second polarizer plates.

8. A liquid crystal display device according to claim 7, wherein an in-plane retardation of said optical compensation film is 190 nm~390 nm.

9. A liquid crystal display device according to claim 7, wherein an in-plane retardation of said optical compensation film is 190 nm~390 nm and a retardation in a direction of thickness of said optical compensation film is 0.3~0.65.

10. A liquid crystal display device according to claim 7, wherein an in-plane retardation of said optical compensation film is 210 nm~310 nm and a retardation in a direction of thickness of said optical compensation film is 0.3~0.65.

11. A liquid crystal display device according to claim 7, wherein liquid crystal molecules of said liquid crystal layer are orientated in a direction to provide said black displaying state when a voltage applied to said electrodes is at zero level or at a minimum level.

* * * * *